Dec. 17, 1968   F. BIEDERMANN ET AL   3,416,421
EXPOSURE CONTROL FOR PHOTOGRAPHIC CAMERAS
Filed April 28, 1966   2 Sheets-Sheet 1
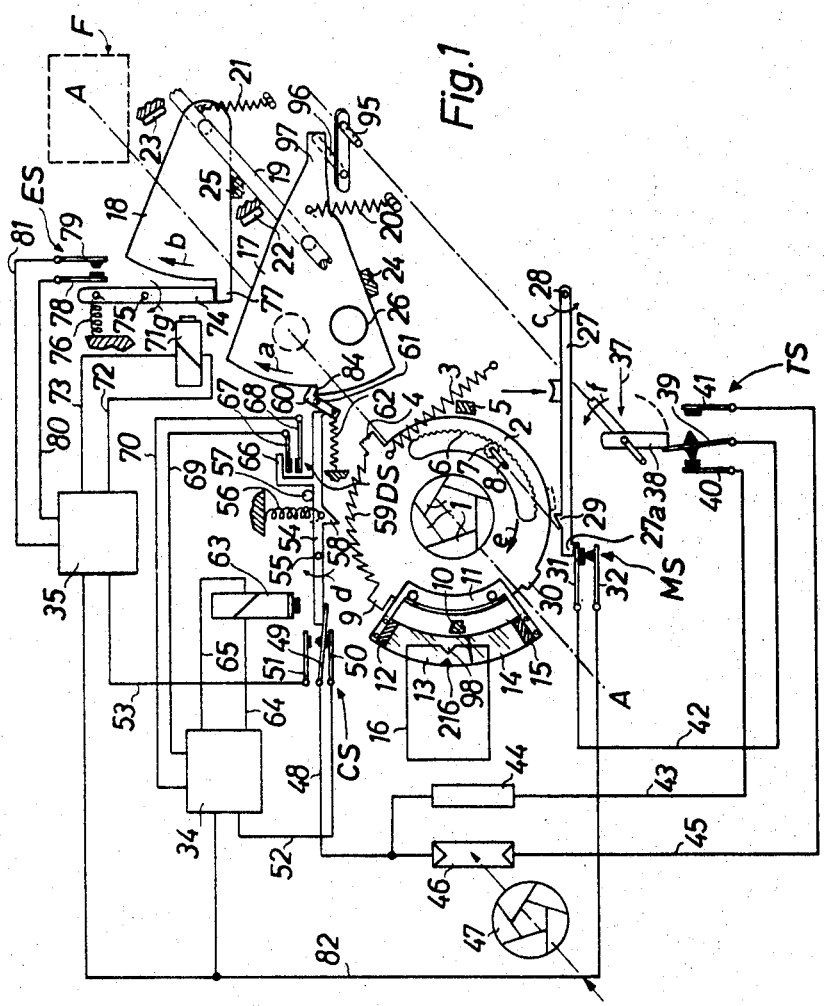
INVENTOR.
FRIEDRICH BIEDERMANN
BY  ERWIN v. WASIELEWSKI
JOACHIM v. ALBEDYLL
Michael S. Striker
Attorney

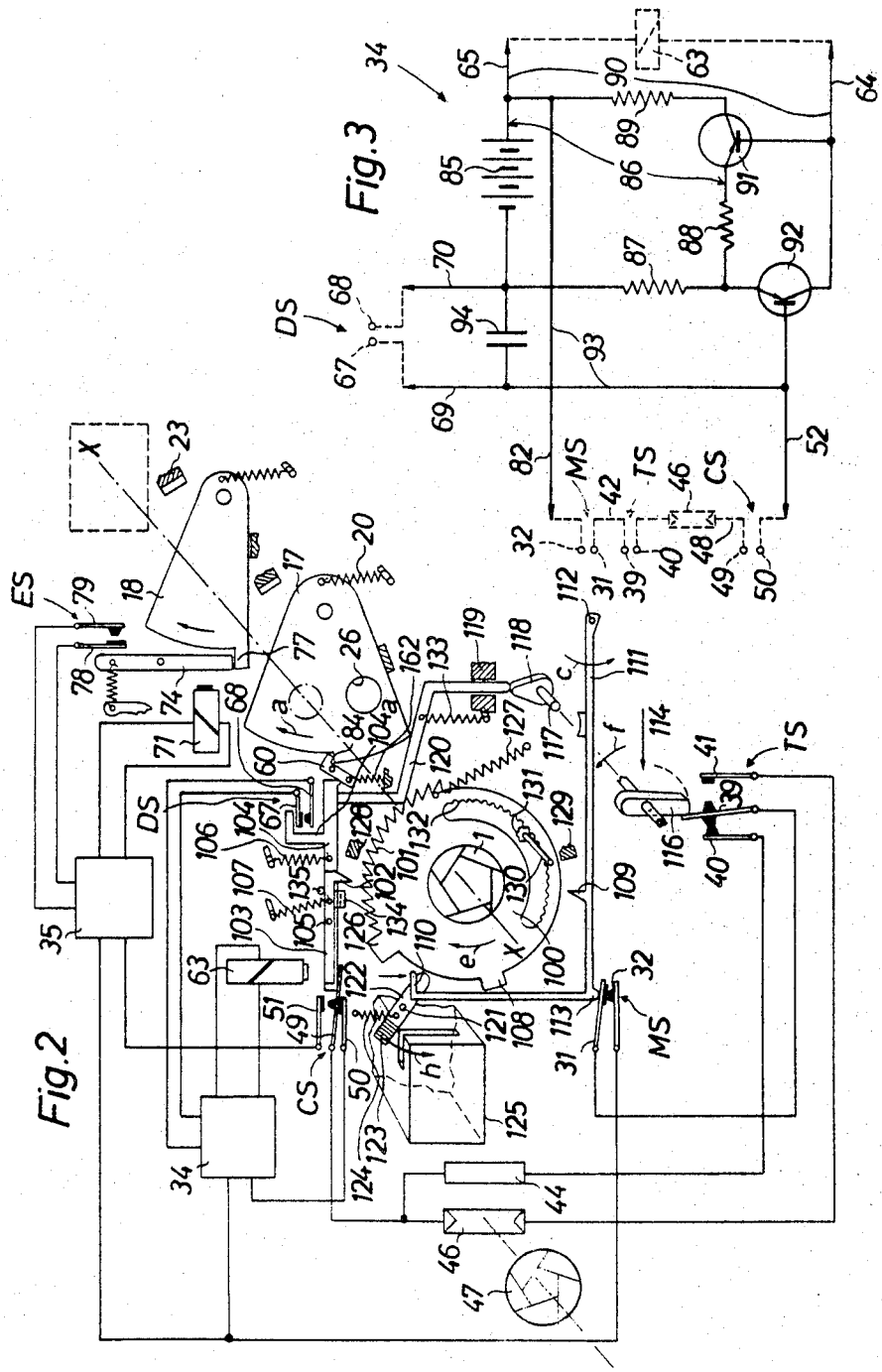

United States Patent Office 3,416,421
Patented Dec. 17, 1968

3,416,421
EXPOSURE CONTROL FOR PHOTOGRAPHIC CAMERAS
Friedrich Biedermann, Unterhaching, near Munich, and Erwin von Wasielewski and Joachim von Albedyll, Munich, Germany, assignors to Agfa-Gevaert Aktiengesellschaft, Leverkusen, Germany
Filed Apr. 28, 1966, Ser. No. 546,017
Claims priority, application Germany, May 6, 1965, A 49,123
20 Claims. (Cl. 95—10)

The present invention relates to photographic cameras. More particularly, the invention relates to improvements in photographic cameras of the type wherein the exposure time and/or the size of the diaphragm aperture may be selected in a fully automatic way. Still more particularly, the invention relates to an electromagnetic exposure control for photographic cameras.

It is an important object of the present invention to provide a very simple exposure control for photographic cameras and to construct the camera in such a way that the operator can immediately determine whether or not the intensity of incoming light suffices for taking of a satisfactory picture.

Another object of the invention is to provide a camera which can automatically indicate to the user whether or not the intensity of incoming light is excessive for taking of satisfactory pictures.

A further object of the invention is to provide an exposure control wherein the selection of the size of the diaphragm aperture and the selection of exposure time can be effected by electromagnetic means and whose electric circuitry includes a battery or an analogous source whose charge can be determined in a very simple and time-saving manner.

An additional object of the invention is to provide an exposure control of the just outlined characteristics wherein the testing of the battery cannot result in making of an exposure and wherein such testing may be carried out simultaneously with direct or indirect blocking of the shutter.

Still another object of the instant invention is to provide a photographic camera which embodies the above outlined exposure control and wherein the testing unit for the battery may be converted into a light meter.

Another object of the present invention is to provide a camera wherein the exposure control automatically selects a predetermined diaphragm aperture and a predetermined exposure time for any given light intensity.

An ancillary object of the invention is to provide a camera wherein the intensity of incoming light may be determined with requisite accuracy without necessitating the use of a conventional light meter.

A further object of the invention is to provide a camera wherein the shutter and the diaphragm may be operated automatically or manually so that the operator can make an exposure even if the automatic exposure control indicates that the intensity of incoming light is excessive or insufficient for taking of satisfactory pictures.

Another object of the invention is to provide a novel operative connection between the exposure control and the diaphragm of the improved camera.

An additional object of the invention is to provide a novel operative connection between the exposure control and the shutter of the improved camera.

Still another object of the invention is to provide a novel operative connection between the shutter and the battery testing unit of the improved camera.

An additional object of the invention is to provide a novel operative connection between the trigger and the diaphragm of the improved camera.

Another object of our invention is to provide a novel control device which can be used in the improved camera to indicate the condition of the battery and/or the intensity of incoming light.

A further object of the invention is to provide the improved camera with a control device which can automatically prevent operation of the shutter if the intensity of incoming light is unsatisfactory for taking of pictures.

A concomitant object of the invention is to provide a camera wherein each exposure time corresponds to a predetermined size of the diaphragm aperture.

Briefly stated, one feature of our present invention resides in the provision of a photographic camera which comprises a diaphragm including a ring or analogous setting means normally assuming a first end position (in which the diaphragm aperture may be fully open) and movable to a second end position through a plurality of intermediate positions each of which corresponds to a different size of the diaphragm aperture (the diaphragm may be fully closed in the second end position of the setting means), cocking means for moving the setting means to second end position, a trigger for releasably holding the setting means in second end position and operative (for example, in response to manual depression) to release the setting means so that the latter starts to move to first end position, a shutter which may comprise one or more blades or sectors and is movable between open and closed positions, opening means and closing means for the shutter, an exposure control comprising two delay circuits including light-sensitive means (such as one or more light-sensitive resistors) for selecting the delaying action of the two circuits as a function of the intensity of light reaching the light-sensitive means, a trip on the trigger for completing one of the delay circuits in response to operation of the trigger, a first electromagnet forming part of the one circuit and energizable with a delay determined by the light-sensitive means to arrest the setting means on operation of the trigger in a position wherein the size of the diaphragm aperture is a function of the light intensity, to actuate the opening means for the shutter so that the shutter opens if the light intensity is satisfactory and to complete the other delay circuit, and a second electromagnet connected in the other delay circuit and energizable with a delay determined by the light-sensitive means to actuate the closing means for the shutter so that the exposure time is also a function of light intensity, and control means cooperating with the setting means for indicating the intensity of light.

Such control means may include a fixed index and a scale which is movable along the index in response to movement of setting means from first end position. Alternatively, the control means may comprise a rockable scale or indicator which can be displaced by the setting means and then appears in a view finder to indicate to the user of the camera that the intensity of incoming light is either too low or too high for taking of a satisfactory picture. Still further, the control means may comprise a locking device which automatically locks the shutter or the opening means for the shutter when the first electromagnet arrests the setting means in a position which is indicative of unsatisfactory light intensity.

The novel features which are considered as characteristic of the invention are set forth in particular in the appended claims. The improved camera itself, however, both as to its construction and the mode of manipulating the same, together with additional features and advantages thereof, will be best understood upon perusal of the following detailed description of certain specific embodiments with reference to the accompanying drawings, in which:

FIG. 1 is a diagrammatic exploded perspective view of a portion of a still camera which embodies one form of our invention and wherein the testing unit is ready to determine the charge of a battery which is connected in the delay circuits;

FIG. 2 is a similar schematic exploded perspective view of a modified camera; and FIG. 3 is a diagram showing one of the delay circuits.

Referring to the drawings in detail, and first to FIG. 1, there is shown a portion of a still camera which comprises an iris diaphragm having a plurality of relatively movable diaphragm blades 1. These blades are movable through the intermediary of a setting member here shown as a ring 2 which is rotatable about the optical axis A—A between two end positions and through a plurality of intermediate positions each of which corresponds to a different diaphragm aperture defined by the blades 1. A helical return spring 3 serves as a means for permanently biasing the setting ring 2 to one end position in which a projection 4 of the ring 2 abuts against a fixed stop 5 forming part of or secured to the camera housing. The cocking means for moving the setting ring 2 to the other end position or fully cocked position comprises a pinion 7 which is rotatable by a shaft 8 and meshes with a toothed portion 6 of the ring 2. The shaft 8 may be rotated by means of a suitable lever or the like, not shown. In the illustrated embodiment, the toothed portion 6 bounds the concave side of an arcuate slot in the setting ring 2. When the latter is moved to cocked position, its projection 9 abuts against a second fixed stop 10 of the camera housing.

In accordance with a feature of the present invention, the setting ring 2 carries one component of a control device serving to indicate the intensity of incoming light. This component includes a scale member 11 which is riveted, screwed or otherwise affixed to the setting ring 2 and comprises four portions or fields 12, 13, 14 and 15. Each of these fields may be colored in a different way to facilitate ready discrimination therebetween. As shown, a portion of the scale member 11 overlies the window of a view finder 16 which carries a fixed index member 98. A second index member or marker 216 is provided on the field 13 of the scale 11. Thus, the user of the camera can look through the view finder 16 to determine which of the fields 12 to 15 registers with the fixed index 98. Each of the fields 13, 14 may carry graduations which indicate different diaphragm apertures.

It is clear that the iris diaphragm 1, 2 which is shown in FIG. 1 can be replaced by another diaphragm without departing from the spirit of our invention. For example, the camera may comprise a so-called cat's eye diaphragm. It is further clear that the setting ring 2 need not form part of the diaphragm proper but may be arranged to change the size of the diaphragm aperture through the intermediary of one or more motion transmitting rings or the like. Thus, the setting ring 2 could be coupled by one or more springs with a second ring adapted to directly effect movement of diaphragm blades 1 with reference to each other.

The shutter of the camera comprises two relatively movable shutter blades or sectors 17 and 18 which are rockable on a common shaft 19 extending in parallelism with the axis X—X. The sectors 17, 18 are respectively biased by helical return springs 20, 21 which tend to rock them in a clockwise direction as indicated by arrows $a$ and $b$ and to maintain the sectors in abutment with fixed stops 22, 23. These sectors may be cocked by a suitable lever or the like (not shown), and then respectively abut against fixed stops 24, 25. It will be seen that FIG. 1 shows the sectors 17, 18 in cocked positions. The sector 17 is formed with a circular opening 26 which is out of registry with the optical axis X—X when the sector 17 is cocked, i.e., when this sector abuts against the fixed stop 24. When cocked, the other sector 18 is not located in the path of incoming light. In other words, the shutter including the sectors 17, 18 will be open when the sectors 17, 18 respectively abut against the stops 22, 25 but will be closed in all other positions of its sectors. For example, the shutter will be closed if the sector 17 abuts against the stop 22 but the sector 18 leaves the position of FIG. 1 and moves against the stop 23. The means for opening the shutter (when the sectors 17, 18 are cocked) comprises the spring 20 and a two-armed opening level 54 which is fulcrumed at 55 and can rock a small pawl 60 whose pallet or tang normally engages a shoulder 84 of the sector 17 under the bias of a contraction spring 62. The means for closing the shutter comprises the spring 21 and a two-armed closing lever 74 which is biased by a spring 76 and normally engages a shoulder 77 of the sector 18. The closing lever 74 is fulcrumed at 75.

The camera further comprises a manually operable trigger 27 which resembles a one-armed lever and is rockable on a pivot pin 28. This trigger 27 also serves as a part of means for testing the condition of a source 85 of electrical energy (see FIG. 3) which is connected in two delay circuits 34 and 35. As shown in FIG. 1, the trigger 27 carries a retaining projection in the form of a tooth 29 which can engage a projection 30 on the setting ring 2 to maintain the latter in cocked position, namely, in that end position in which the projection 9 abuts against or is close to the fixed stop 10. The position of the projection 30 in cocked position of the setting member 2 is indicated in FIG. 1 by broken lines. In such position, the projection 30 bears against the tooth 29 of the trigger 27 and is biased by the spring 3 which tends to rotate the setting ring 2 in a clockwise direction (arrow $e$) and to maintain this setting ring in the end position in which the projection 4 abuts against the fixed stop 5.

The free end portion 27a of the trigger 27 constitutes a trip which can close a master switch MS as soon as the trigger is depressed by hand and is caused to turn in a counterclockwise direction as indicated by the arrow $c$. In other words, the master switch MS will close when the tooth 29 is caused to move away from the projection 30 so that the setting ring 2 can follow the bias of the spring 3. FIG. 1 shows the trigger 27 in depressed position in which the trip 27a of this trigger maintains a movable contact 31 of the master switch MS in engagement with a fixed contact 32. The switch MS is normally open, i.e., the contact 31 is resilient and tends to move away from the fixed contact 32. When the switch MS is closed by the trip 27a of the trigger 27, it completes the first delay circuit 34 and its closing is also a prerequisite for completion of the second delay circuit 35. These circuits form part of the exposure control which selects the size of the diaphragm aperture and the exposure time in a fully automatic way and in dependency on the intensity of incoming light.

The testing unit for the source 85 comprises a testing member 37 which is turnable by hand and is mounted on a shaft 95. The member 37 comprises a trip 38 which can change the condition of a testing switch TS including two fixed contacts 40, 41 and a movable contact 39 which is disposed between the contacts 40, 41. When the testing member 37 is moved to the position shown in FIG. 1, the trip 38 maintains the contact 39 in engagement with the fixed contact 40. The contacts 39, 40 together constitute a switch which is connected in series with the master switch MS and can complete a circuit which includes the source 85 and a fixed testing resistor 44. The testing member 37 allows for movement of the trigger 27 to a position in which the trip 27a of the trigger closes the master switch MS. If the testing member 37 is rotated in a counterclockwise direction (arrow $f$), its trip 38 can move the contact 39 against the contact 41 or the contact 39 may exhibit the tendency to remain in engagement with the contact 41 as soon as the testing member 37 is turned in the direction indicated by the arrow $f$.

The contact 39 of the testing switch TS is connected to a lead 42 which is also connected with the movable contact 31 of the master switch MS. A lead 43 connects the contact 40 of the testing switch TS with the aforementioned fixed testing resistor 44, and a third lead 45 connects the contact 41 of the testing switch TS with a light sensitive resistor 46. This resistor 46 is located behind a second or auxiliary iris diaphragm 47 whose aperture may be adjusted to account for various factors which can influence the exposure. For example, the diaphragm 47 may be adjusted to account for the sensitivity of film which is used in the camera, to take into consideration the direction in which the optical axis is inclined with reference to incident light (particularly when the user makes an exposure against sun), and/or to account for a light correction factor.

The leads 43, 45 are connected to a single lead 48 which connects the resistors 44, 46 with the movable resilient contact 49 of a control switch CS. The control switch CS further comprises two fixed contacts 50, 51 which are disposed at the opposite sides of the movable contact 49. The contact 50 is connected with a lead 52 which is also connected in the delay circuit 34. A lead 53 connects the contact 51 with the second delay circuit 35. The movable contact 49 tends to remain in engagement with the fixed contact 51 but is normally held in engagement with the contact 50 by one arm of the opening lever 54.

The spring 56 tends to maintain the opening lever 54 in abutment with a fixed stop 57. A tooth 58 on the right-hand arm of the opening lever 54 can be moved into engagement with a toothed or serrated portion 59 of the setting ring 2 to arrest this ring in an intermediate position against the bias of the return spring 3. The tooth 58 can also engage with the projection 4 or 9 of the setting ring 2. When the opening lever 54 abuts against the stop 57, its right-hand arm allows the pawl 60 to follow the bias of the spring 62 and to engage the shoulder 84 of the sector 17, provided that the latter is cocked and abuts against the stop 24.

The opening lever 54 may be rocked by an electromagnet 63 which forms part of the delay circuit 34. The lever 54 actually constitutes a movable armature which is rocked against the bias of the spring 56 when the electromagnet 63 is energized with a delay determined by the light-sensitive resistor 46. The terminals of the electromagnet 63 are connected to leads 64, 65 of the delay circuit 34. The direction in which the opening lever 54 is rocked in response to energization of the electromagnet 63 is indicated by an arrow $d$. A bent-over portion or leg 66 of the opening lever 54 constitutes a trip which can close a short-circuiting switch DS by shifting a movable contact 67 against a fixed contact 68. The contact 67 is resilient and tends to move away from the contact 68. The switch DS is connected in the delay circuit 34 by leads 69, 70.

The shutter which includes the sectors 17, 18 can be closed by the second delay circuit 35 which includes an electromagnet 71. The armature of this electromagnet is constituted by the closing lever 74. Two leads 72, 73 connect the electromagnet 71 in the delay circuit 35 and, when energized, the electromagnet 71 causes the lever 74 to rock in the direction indicated by an arrow $g$ and to close the contacts 78, 79 of a normally open short-circuiting switch ES. Leads 80, 81 connect the contacts 78, 79 of the switch ES in the delay circuit 35. A further lead 82 connects the delay circuits 34, 35 with the fixed contact 32 of the master switch MS.

The exact construction of the delay circuits 34, 35 forms no part of the present invention. FIG. 3 shows, by way of example, the components of the delay circuit 34. The circuit 35 may be of similar or identical construction. Referring now to FIG. 3 in detail, the delay circuit 34 includes the source 85, here shown as a battery, and a first subcircuit 86 which includes three serially connected resistors 87, 88, 89 and the emitter-collector stage of a first transistor 91. A second subcircuit 90 of the delay circuit 34 is connected with the poles of the battery 85 and includes the aforementioned leads 64, 65, the electromagnet 63, the emitter-collector stage of a second transistor 92 and the aforementioned resistor 87. In other words, the resistor 87 forms part of the subcircuits 86 and 90. A third subcircuit 93 is completed and is connected with the poles of the battery 85 in response to closing of contacts 31, 32 and 39, 40 and 49, 50. This third subcircuit 93 includes the light-sensitive resistor 46 which is connected in series with a capacitor 94. The contacts 67, 68 of the short-circuiting switch DS are connected in parallel with the capacitor 94 (see the leads 69, 70 in FIG. 3).

In order to prevent accidental exposure when the user tests the condition of the battery 85, the shaft 95 of the testing member 37 carries a locking member 96 (see FIG. 1) which can engage an extension 97 of the sector 17 to hold the latter in cocked position in which the sector 17 abuts against the stop 24 so that the opening 26 cannot register with the optical axis X—X. Thus, whenever the testing member 37 is moved to the operative position of FIG. 1, the shutter is automatically locked in closed position and the camera cannot make an exposure.

FIG. 1 illustrates the parts of the camera in positions they assume when the user is about to test the condition of the battery 85. Such testing operation is carried out by moving the testing member 37 to the illustrated position in which the locking member 96 engages the extension 97 of the sector 17 and in which the trip 38 urges the movable contact 39 of the testing switch TS against the fixed contact 40. The shaft 8 has been rotated in a sense to move the setting ring 2 to cocked position in which the projection 9 abuts against the stop 10 and the tooth 29 of the trigger 27 engages the projection 30 to hold the setting ring against the bias of the return spring 3. This spring 3 is expanded and stores energy so that it is ready to turn the ring 2 in a clockwise direction (arrow $e$) as soon as the operator depresses the trigger 27 (arrow $c$). The tooth 29 then moves away from the projection 30 and the trip 27a of the trigger 27 simultaneously closes the contacts 31, 32 of the master switch MS. The spring 3 contracts and rotates the setting ring 2 in a clockwise direction, as viewed in FIG. 1. The contacts 39, 40 and 49, 50 are respectively closed by the trip 38 and opening lever 54 so that the subcircuit 93 of the delay circuit 34 is completed through conductors 52, 48, 43, 42 and 82. The subcircuit 86 is also completed because the transistor 91 conducts current while the transistor 92 blocks the flow of current. The capacitor 94 is being charged through the fixed resistor 44. When the charge of capacitor 94 reaches a given value, the transistor 92 permits flow of current and the transistor 91 interrupts the flow of current because there is a drop in potential across the electromagnet 63. The electromagnet 63 is energized and rocks the opening lever 54 in the direction indicated by arrow $d$. This opens the contacts 49, 50 so that the subcircuit 93 opens. The contacts 67, 68 of the switch DS are closed so that the capacitor 94 is fully discharged.

As the opening lever 54 is rocked by the electromagnet 63, it turns the pawl 60 in a counterclockwise direction, as viewed in FIG. 1, so that the pallet of this pawl releases the shoulder 84 of the sector 17. At the same time, the tooth 58 of the lever 54 engages the adjoining tooth of the serrated portion 59 on the setting ring 2 to hold the latter in an intermediate position which corresponds to a given diaphragm aperture. Depending on the condition of the battery 85, the marker 216 of the scale member 11 will assume a certain position with reference to the fixed index member 98 in the view finder 16. For example, the arrangement may be such that, as long as the charge of the battery 85 is still satisfactory, the marker 216 will come to a halt at a level below the fixed index member 98. If the marker 216 comes to a halt at a level above the index member 98, the operator knows that the battery must be replaced or recharged.

As stated before, energization of the electromagnet 63 results in disengagement of the pawl 60 from the shoulder 84 of the sector 17. However, the shutter remains closed because the locking member 96 of the shaft 95 for the testing member 37 remains in the path of the extension 97 and thus prevents rocking of the sector 17 under the bias of the spring 20 (arrow $a$). In other words, testing of the battery 85 does not result in making of an exposure. If the user wishes to make an exposure with automatic selection of the diaphragm aperture and exposure time, the testing member 37 is turned through an angle of 90 degrees (arrow $f$). This moves the locking member 96 away from the path of the extension 97. The setting ring 2 is cocked through the shaft 8 and pinion 7 so that the tooth 29 of the trigger 27 engages the projection 30. In response to depression of the trigger 27 (arrow $c$), the tooth 29 moves away from the projection 30 and the ring 2 begins to turn in clockwise direction (arrow $e$). Of course, depression of the trigger 27 results in closing of the master switch MS by the trip 27$a$ because the contact 31 is moved against the contact 32. On the other hand, and since the trip 38 of the testing member 37 has been moved away from the contact 39 of the testing switch TS, the contact 39 engages the fixed contact 41 whereby a current flows through the leads 52, 48, 45, 42 and 82. The delay circuit 34 is completed in the same way as described above with the exception that the current flows through the light-sensitive resistor 46 instead of flowing through the fixed testing resistor 44. In other words, the exact moment of energization of the electromagnet 63 is determined by the intensity of light passing through the auxiliary diaphragm 47 and impinging against the resistor 46. As stated before, the diaphragm 47 is adjusted to take into consideration one or more factors, such as the sensitivity of film and others. Energization of the electromagnet 63 results in rocking of the opening lever 54 (arrow $d$) whereby the tooth 58 engages the serrated portion 59 of the setting ring 2 and arrests the latter in an intermediate position corresponding to a given diaphragm aperture, namely, an aperture which is a function of the intensity of light passing through the auxiliary diaphragm 47. The opening lever 54 also causes the pawl 60 to move away from the shoulder 84 so that the sector 17 is free to follow the bias of the spring 20 (arrow $a$) and the opening 26 moves into registry with the optical axis X—X to admit light against the film F. Furthermore, the opening lever 54 releases the movable contact 49 of the control switch CS so that the contact 49 engages the contact 51 to complete the delay circuit 35. The resistance of the light-sensitive element 46 determines the delay with which the circuit 35 energizes the electromagnet 71 which latter then rocks the closing lever 74 (arrow $g$) so that this lever releases the shoulder 77 and allows the sector 18 to follow the bias of the return spring 21 and to move into the path of light passing through the opening 26 of the sector 17. This closes the shutter and the exposure is completed. At the same time, the lever 74 closes the short-circuiting switch ES so that the capacitor of the delay circuit 35 discharges in the same way as described in connection with the capacitor 94 shown in FIG. 3. In other words, the function of the switch ES is analogous to that of the switch DS in the delay circuit 34.

If the intensity of incoming light is very high, the delay circuit 34 will energize the electromagnet 63 with a minimum of delay following depression of the trigger 27 so that the tooth 58 of the opening lever 54 arrests the setting ring 2 shortly after this ring begins to turn in the direction of the arrow $e$. The delay may be so short that the tooth 58 engages a finely roughened or serrated portion of the projection 4 on the setting ring 2. In such angular position of the setting ring 2, the field 12 of the scale member 11 on the ring 2 is adjacent to the fixed index member 98 which informs the user that the camera cannot make a satisfactory exposure because the intensity of incoming light is too high. The making of an exposure is prevented in a fully automatic way because, if the tooth 58 engages the serrated portion of the projection 4 on the setting ring 2, the opening lever 54 can rock only through a very small angle which does not suffice to disengage the pawl 60 from the shoulder 84 of the sector 17 so that the latter cannot follow the bias of the spring 20 and cannot place the opening 26 into registry with the optical axis X—X. When the trigger 27 is released, the operator simply rotates the shaft 8 to return the setting ring 2 to fully cocked position in which the tooth 29 of the trigger 27 reengages the projection 30.

If the intensity of incoming light is satisfactory, depression of the trigger 27 will again result in completion of the delay circuit 34 but the tooth 58 of the opening lever 54 will engage the serrated portion 59 of the ring 2 (i.e., not the serrated portion of the projection 4) so that the opening 54 can be rocked sufficiently to move the pawl 60 away from the shoulder 84 of the sector 17. The field 13 or 14 of the scale member 11 on the setting ring 2 then moves into registry with the fixed index member 98 in the view finder 16 and the operator notices that the camera can make a satisfactory exposure. If the diaphragm is constructed in such a way that it is closed when the setting ring 2 is fully cocked, the field 14 will indicate that range of exposures which can be made with the camera held by hand, i.e., without the danger of blurring by accidental shaking of the camera during exposure. The field 13 will indicate that range of exposures which can be made with the camera mounted on a tripod or another suitable support. Furthermore, the diaphragm may be constructed in such a way that the aperture is fully open when the fixed index member 98 registers with the line separating the fields 13 and 14, i.e., when it becomes desirable to make exposures with the camera mounted on a tripod. In other words, when the index member 98 registers with the field 13, the diaphragm is fully open and all that is changed by the exposure control is the exposure time, i.e., the exact moment of energization of the electromagnet 71 following energization of the electromagnet 63. The above (namely, that the diaphragm is fully open when the exposure should be made with the camera mounted on a tripod) constitutes an optional feature of the present invention.

If the intensity of incoming light is very low, the electromagnet 63 will be energized with such a delay that the serrated portion 59 of the setting ring 2 moves past the tooth 58 of the opening lever 54 and the projection 4 is allowed to move against the stop 5. This places the projection 9 directly below the tooth 58 so that, when the electromagnet 63 is energized, the opening lever 54 can perform a very small angular movement (arrow $d$) before the tooth 58 engages the projection 9. Such small angular movement of the opening lever 54 does not suffice to disengage the pawl 60 from the shoulder 84 of the sector 17 so that the shutter remains closed and the camera cannot make an exposure. In such angular position of the setting ring 2, the fixed index member 98 registers with the field 15 and the operator notes that the camera cannot make a satisfactory exposure because the intensity of incoming light is too low. The operator then simply releases the trigger 27 and rotates the shaft 8 to cock the setting ring 2 and to return the projection 30 into engagement with the tooth 29. The trigger 27 is permanently biased by a spring (not shown) which tends to rock the trigger in a clockwise direction, as viewed in FIG. 1.

The embodiment of FIG. 2 is similar to the embodiment of FIGS. 1 and 3, particularly as regards the construction and function of delay circuits 34, 35 and shutter 17, 18. The setting ring 100 of the diaphragm is again provided with a toothed or serrated portion 101 which can be engaged by the tooth 102 of a separate holding or arresting armature or lever 103. The lever 103 is rockable on a pivot pin 105 which also carries an opening armature or lever 104 corresponding to the opening lever 54 of FIG. 1. The levers 103, 104 are respectively biased by springs 107, 106 which urge them against a fixed stop 135. When the electromagnet 63 of the delay circuit 34 is energized, the levers 103, 104 are caused to rock in a clockwise direction, as viewed in FIG. 2, whereby the opening lever 104 rocks the pawl 60 in a counterclockwise direction and moves the pallet of this pawl away from the shoulder 84 of the sector 17. At the same time, the opening lever 104 releases the movable contact 49 of the control switch CS so that the contact 49 can move away from the contact 50 and engages the contact 51.

The setting ring 100 carries an actuating member here shown as a projection 108 which can be engaged by the tooth 109 of the trigger 111 and which can also engage a bent-over extension or nose 110 of the trigger. The latter is rockable on a fixed pin 112 and carries a trip 113 which can close the contacts 31, 32 of the master switch MS.

The testing member 114 comprises a shaft 117 which carries a trip 116 adapted to move the contact 39 of the testing switch TS against the fixed contact 40, i.e., away from engagement with the fixed contact 41. The shaft 117 carries a control cam 118 which can shift a locking slide 120 guided in fixed ways 119. The upper end portion of the slide 120 can bear against the opening lever 104 and this slide is biased by a spring 133 which tends to maintain its lower end in abutment with the face of the control cam 118. When the slide 120 is engaged by the lobe of the control cam 118 (as actually shown in FIG. 2), the lever 104 is held in abutment with the stop 135 and cannot be attracted by the electromagnet 63. It is to be noted that the spring 162 which biases the pawl 60 of FIG. 2 is an expansion spring and tends to normally hold the pallet of this pawl in engagement with the shoulder 84.

The actuating member or projection 108 of the setting ring 100 can also engage and rock a lever-shaped scale member or warning member 122 which is pivotable on a pin 121. The scale member 122 has one or more fields 123 and is biased by a spring 124 which tends to rock it in a clockwise direction, as viewed in FIG. 2, so that the field 123 is moved away from a slot provided for the scale member 122 in a view finder 125. When the projection 108 of the setting ring 100 engages the right-hand arm of the scale member 122, the field 123 can be moved into the slot of the view finder 125 and can be observed by the user of the camera. The arrangement is such that the field 123 of the scale member 122 will be visible in the view finder 125 when a projection 126 of the setting ring 100 moves to a level directly below the tooth 102 of the arresting lever 103. The setting ring 100 is biased by a return spring 127 and tends to rotate in a clockwise direction as indicated by the arrow e. The extent to which the setting ring 100 can move under and against the bias of the spring 127 is determined by two fixed stops 128 and 129. The means for cocking the setting ring 100 comprises a shaft 130, a pinion 131 on the shaft 130 and a toothed segment 132 on the ring 100. The shaft 130 can be rotated by means of a lever or the like, not shown. When the setting ring 100 is fully cocked, the tooth 109 of the trigger 111 engages the projection 108.

FIG. 2 shows the camera in a position its parts assume preparatory to testing of the battery 85 in the delay circuits 34 and 35. The testing member 114 then prevents movement of the sector 17 to open position because the lobe of the control cam 118 maintains the slide 120 in raised position and the slide prevents the opening lever 104 from moving away from the stop 135. Thus, even if the delay circuit 34 energizes the electromagnet 63, this electromagnet cannot attract the opening lever 104 and the pallet of the pawl 60 remains in engagement with the shoulder 84 of the sector 17.

Prior to actual testing of the battery 85, the shaft 130 is caused to move the setting ring 100 to cocked position in which the projection 108 of this ring engages the tooth 109 of the trigger 111. The sectors 17, 18 are cocked so that their shoulders 84 and 77 are respectively engaged by the pawl 60 and closing lever 74 whereby the opening 26 of the sector 17 is out of registry with the optical axis X—X. The testing member 114 is moved to the position of FIG. 2 so that the opening lever 104 is locked and that the trip 116 urges the contact 39 against the contact 40. The master switch MS is closed by the trip 113 in automatic response to depression of the trigger 111 whereby the latter's tooth 109 releases the projection 108 so that the spring 127 contracts and rotates the setting ring 100 in a clockwise direction as indicated by the arrow e. 100 in a clockwise direction as indicated by the arrow e. The delay circuit 34 is completed because the master switch MS is closed and because the trip 116 closes the contacts 39, 40 of the testing switch TS. The fixed testing resistor 44 is connected in the delay circuit 34 and the latter will energize the electromagnet 63 with a delay which suffices to insure that the tooth 102 of the arresting lever 103 will engage one tooth of the serrated portion 101 on the setting ring 100. When the tooth 102 engages the serrated portion 101, the projection 108 of the setting ring 100 is spaced from the scale member 122 so that the field 123 of this scale is not moved into the slot of the view finder 125. The user of the camera looks through the view finder 125 and, failing to see the scale member 122, knows that the charge of the battery 85 is satisfactory. If the charge of the battery is unsatisfactory, the delay circuit 34 energizes the electromagnet 63 with a delay which suffices to enable the setting ring 100 to assume an angular position in which the projection 126 engages the fixed stop 128. The projection 108 of the setting ring 100 then engages the scale member 122 and moves the field 123 into the slot of the view finder 125 (see the arrow h in FIG. 2). This is noted by the user and the user realizes that the charge of the battery 85 is unsatisfactory. The camera cannot make an exposure because the lobe of the control cam 118 maintains the slide 120 in raised position so that the opening lever 104 bears against the stop 135.

If the camera is to take a picture with automatic selection of exposure values, the testing member 114 is turned in a counterclockwise direction and through an angle of about 90 degrees (see the arrow f) whereby the lobe of the control cam 118 moves to a lower level and the spring 133 contracts to move the slide 120 away from the opening lever 104. At the same time, the trip 116 releases the contact 39 of the testing switch TS so that the contact 39 moves against the contact 41 and connects the light-sensitive resistor 46 in the delay circuits 34 and 35. The setting member 100 is cocked again by the shaft 130 so that the projection 108 is reengaged by the tooth 109. The trigger 111 is then depressed (arrow c) so that the tooth 109 is disengaged from the projection 108 and the spring 127 is free to contract whereby the setting ring 100 rotates in a clockwise direction (arrow e). The diaphragm blades 1 increase the size of the aperture until the delay circuit 34 energizes the electromagnet 63 with a delay determined by the intensity of light which reaches the light-sensitive resistor 46 through the aperture of the auxiliary diaphragm 47. If the intensity of incoming light is satisfactory for making an exposure, the electromagnet 63 is energized in time to bring about engagement of the tooth 102 with the serrated portion 101 of the setting ring 100. Energization of the electromagnet 63 results in clockwise movement of the levers 103, 104 whereby the tooth 102 engages a given tooth of the serrated portion 101 and the opening lever 104 disengages the pawl 60 from the shoulder 84 of the sector 17. At the same time, the trip 104a of the opening lever 104 closes the short-circuiting switch DS. The sector 17 moves in the direction of the arrow a and places its opening 26 into registry with the optical axis X—X. The sector 18 will move against the stop 23 to close the shutter when the delay circuit 35 energizes the electromagnet 71 so that the latter moves the closing lever 74 away from the shoulder 77. Of course, energization of the electromagnet 63 also results in movement of the contact 49 against the contact 51 to complete the delay circuit 35.

If the intensity of incoming light is unsatisfactory, the electromagnet 63 is energized with such a delay that the projection 126 of the setting ring 100 is allowed to engage the fixed stop 128. The projection 126 is then located at a level directly below the tooth 102 of the arresting lever 103 so that the latter performs a very small angular movement. The lever 103 carries a lug 134 which extends below the opening lever 104 and, when the tooth 102 engages the projection 126, the lug 134 acts as an abutment for the opening lever 104 to hold the latter against excessive rocking movement in a clockwise direction, as viewed in FIG. 2, whereby the lever 104 cannot disengage the pawl 60 from the shoulder 84 of the sector 17 and the camera cannot make an exposure. In such angular position of the setting ring 100 (i.e., when the projection 126 is engaged by the tooth 102 of the arresting lever 103), the projection 108 engages the scale member 122 and maintains the field 123 in the slot of the view finder 125. The operator then knows that the intensity of incoming light is insufficient to make a satisfactory exposure, and he also knows that the camera did not make an exposure.

If the operator decides to make an exposure despite the fact that the scale member 122 extends into the view finder 125, he simply continues to depress the trigger 111 so that the bent-over extension or nose 110 of the trigger rocks the setting ring 100 in a counterclockwise direction, as viewed in FIG. 2, until the projection 126 moves away from the tooth 102 and the latter can be rocked into engagement with a tooth of the serrated portion 101. This suffices to allow for complete disengagement of the pawl 60 from the shoulder 84 of the sector 17 whereby the latter follows the bias of the spring 20 and moves its opening 26 into registry with the optical axis X—X. Th electromagnet 63 then attracts the levers 103, 104 to such an extent that the contact 49 of the control switch CS is free to engage the contact 51 and to thus complete the delay circuit 35. The latter energizes the electromagnet 71 with a maximal delay so that the closing lever 74 is caused to release the shoulder 77 whereby the sector 18 moves against the stop 23 and closes the shutter.

In each of the aforedescribed embodiments of our invention the delay circuits 34, 35 are constructed in such a way that a certain exposure time and a certain size of the diaphragm aperture will correspond to light of given intensity. However, the exact size of the aperture does not necessarily determine the exposure time, or vice versa, so that the selection of the exact exposure time and of the exact size of the diaphragm aperture for any given light intensity is up to the designer.

It is further clear that the improved camera can be modified in a number of ways without departing from the spirit of our invention. For example, the testing member 37 or 114 could be utilized for measuring the intensity of incoming light. This will be readily understood because, if the light-sensitive resistor 46 is connected in the delay circuits 34 and 35 when the trip 38 assumes the position which is shown in FIG. 1, the fixed index member 98 of the view finder 16 will register with a given graduation on the field 13 or 14 of the scale member 11 whereby the graduation which registers with the index member 98 indicates the intensity of incoming light. The camera will not make an exposure as long as the trip 38 engages the contact 39 of the testing switch TS because the shutter sector 17 is then held by the locking member 96 on the shaft 95 of the testing member 37. The same holds true for the camera of FIG. 2 is the trip 116 is arranged to connect the resistor 46 in the circuits 34, 35 at the time when the contact 39 is caused to engage the contact 40 of the testing switch TS. In such modified cameras, the charge of the battery 85 can be tested by a separate testing device.

The position of the index member 98 and scale member 11 may be reversed.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a camera, a diaphragm including setting means normally assuming a first end position and movable to a second end position through a plurality of intermediate positions each of which corresponds to a different diaphragm aperture; cocking means for moving said setting means to second end position; a trigger for releasably holding said setting means in second end position and operative to release said setting means; a shutter movable between open and closed positions; opening and closing means for said shutter; an exposure control comprising two delay circuits including light-sensitive means for selecting the delaying action of said circuits as a function of the intensity of light reaching said light-sensitive means, means for completing one of said circuits in response to operation of said trigger and said one circuit including a first electromagnet energizable with a delay determined by said light-sensitive means to arrest said setting means on operation of said trigger in a position wherein the size of said aperture is a function of said intensity, to actuate said opening means and to complete the other circuit, said other circuit including a second electromagnet energizable with a delay determined by said light-sensitive means to actuate said closing means so that the exposure time is also a function of said intensity; and control means cooperating with said setting means for indicating said intensity.

2. A structure as set forth in claim 1, wherein said control means includes indicator means including a first member and a second member movable by said setting means to indicate said intensity by its position with reference to said first member.

3. A structure as set forth in claim 1, wherein said control means comprises a device for locking said opening means when the intensity of light reaching said light-sensitive means is unsatisfactory for taking a picture.

4. A structure as set forth in claim 1, wherein said control means comprises an index member and a scale member, one of said members being fixed and the other member being movable along said fixed member in response to movement of said setting means from said second end position.

5. A structure as set forth in claim 4, wherein said scale member is provided with at least one set of graduation indicating different sizes of said aperture.

6. A structure as set forth in claim 1, wherein said control means comprises a warning member movable to a plurality of positions in at least one of which said warning member is observable by the user of the camera to thus indicate that the intensity of incoming light is unsatisfactory for making an exposure, and actuating means movable in response to movement of said setting means from second end position to move said warning member to said one position when the position of said setting means is indicative of unsatisfactory light intensity.

7. A structure as set forth in claim 6, wherein said warning member is rockable about a fixed axis and further comprising a view finder into which the warning member extends in said one position thereof.

8. A structure as set forth in claim 1, wherein said control means comprises an index member and a scale member, one of said members being movable along the other member in response to movement of said setting means from second end position and said scale member having a plurality of fields one of which registers with said index member when the intensity of incoming light is satisfactory for taking pictures while the camera is held by hand and another of which registers with said index member when the intensity of incoming light is such that the taking of satisfactory pictures requires mounting of the camera on a fixed support.

9. A structure as set forth in claim 8, wherein said scale member is connected with said setting means.

10. A structure as set forth in claim 1, wherein said control means comprises a device for locking said opening means in each such position of said setting means which is indicative of unsatisfactory light intensity.

11. A structure as set forth in claim 1, wherein said control means comprises locking means for preventing movement of said shutter to open position when the user does not wish to make an exposure.

12. A structure as set forth in claim 11, further comprising manually operated means for moving said locking means to an inoperative position in which said locking means cannot prevent opening of said shutter.

13. A structure as set forth in claim 1, wherein said control means comprises a projection provided on said setting means and said opening means comprises an armature movable in response to energization of said first electromagnet to thereby effect opening of said shutter, said projection being located in the path of movement of said armature to prevent opening of said shutter when the setting means assumes a position which is indicative of unsatisfactory light intensity.

14. A structure as set forth in claim 13, wherein said armature is arranged to directly engage and to thereby arrest said setting means in response to energization of said first electromagnet when the intensity of incoming light is satisfactory for making an exposure.

15. A structure as set forth in claim 1, wherein said exposure control comprises a source of electrical energy normally connected in said delay circuits and further comprising testing means for determining the condition of said source.

16. A structure as set forth in claim 15, wherein said testing means comprises a fixed resistor connectable in said circiuts as a substitute for said light-sensitive means and a manually operated testing member for connecting the resistor in said circuits at the will of the operator, said control means comprising means for indicating the charge of said source in response to completion of one of said circuits by said trigger.

17. A structure as set forth in claim 16, wherein said manually operated testing member comprises a device for preventing opening of said shutter when the fixed resistor is connected in said circuits.

18. A structure as set forth in claim 17, wherein said device is arranged to directly engage said shutter.

19. A structure as set forth in claim 17, wherein said device is arranged to block said opening means for the shutter.

20. A structure as set forth in claim 16, wherein said indicating means comprises an index member and a scale member, one of said members being movable along the other member in response to movement of the setting means from said second end position whereby the relative position of such members indicates the condition of said source.

References Cited

UNITED STATES PATENTS 2,978,970    4/1961    Fahlenberg _____ 95—10 XR
3,348,460    10/1967    Schmitt _____ 95—10

NORTON ANSHER, *Primary Examiner.*

J. F. PETERS, *Assistant Examiner.*

U.S. Cl. X.R.

95—53